United States Patent [19]

Gill

[11] Patent Number: 5,715,120
[45] Date of Patent: Feb. 3, 1998

[54] MAGNETORESISTANCE SENSOR WITH ENHANCED MAGNETORESISTIVE EFFECT

[75] Inventor: Hardayal Singh Gill, Portola Valley, Calif.

[73] Assignee: International Business Machines Corporation, Armonk, N.Y.

[21] Appl. No.: 729,260

[22] Filed: Oct. 9, 1996

[51] Int. Cl.⁶ .................. G11B 5/39; G11B 5/127
[52] U.S. Cl. .................... 360/113; 360/125
[58] Field of Search ................ 360/113, 129, 360/125; 324/252

[56] References Cited

U.S. PATENT DOCUMENTS 5,206,590   4/1993   Dieny et al. ............... 324/252
5,491,600   2/1996   Chen et al. ............... 360/113
5,508,866   4/1996   Gill et al. ............... 360/113
5,508,867   4/1996   Cain et al. ............... 360/113

*Primary Examiner*—John H. Wolff
*Attorney, Agent, or Firm*—Paik Saber

[57] ABSTRACT

A magnetoresistive (MR) sensor having end regions separated from each other by a central region. Hard bias layers disposed in the end regions longitudinally bias an MR layer which is formed in the central region. A soft adjacent layer (SAL) is utilized to transversely bias the MR layer. The MR layer and the hard bias layers are electrically insulated from the SAL by an insulator. The SAL magnetization is fixed through exchange coupling with an antiferromagnetic layer. Separating the MR layer and the hard bias layers from the SAL by an insulator prevents the sense current from flowing in the SAL thus improving the MR effect.

12 Claims, 3 Drawing Sheets

MAGNETORESISTANCE SENSOR WITH ENHANCED MAGNETORESISTIVE EFFECT

BACKGROUND OF THE INVENTION

1. Technical Field

This invention relates in general to a magnetoresistive read sensor for reading signals recorded in a magnetic medium and, more particularly, it relates to a magnetoresistive read sensor with improved magnetoresistive effect.

2. Description of the Background Art

Computers often include auxiliary memory storage devices having media on which data can be written and from which data can be read for later use. A direct access storage device (disk drive) incorporating rotating magnetic disks is commonly used for storing data in magnetic form on the disk surfaces. Data is recorded on concentric, radially spaced information tracks on the disk surfaces. Magnetic heads including read sensors are then used to read data from the tracks on the disk surfaces.

In high capacity disk drives, magnetoresistive read sensors, commonly referred to as MR heads, are the prevailing read sensors because of their capability to read data from a surface of a disk at greater linear densities than thin film inductive heads. An MR sensor detects a magnetic field through the change in the resistance of its MR sensing layer (also referred to as an "MR element") as a function of the strength and direction of the magnetic flux being sensed by the MR layer.

The most common MR sensors currently under utilization in the high capacity disk drives are anisotropic magnetoresistive (AMR) sensors manifesting the AMR effect. In the AMR sensor, the electron scattering and therefore the resistance of the MR layer varies as the function of $\cos^2\alpha$ where $\alpha$ is the angle between the magnetization of the MR layer and the direction of the current flowing in the MR layer (FIG. 1). The electron scattering and therefore the resistance is highest for the case where the magnetization of the MR layer is parallel to the current and minimum when the magnetization of the MR layer is perpendicular to the current. U.S. Pat. No. 5,018,037 entitled "Magnetoresistive Read Transducer Having Hard Magnetic Bias", granted to Krounbi et al. on May 21, 1991, discloses an MR sensor operating on the basis of the AMR effect.

Referring back to FIG. 1, there is shown a prior art AMR sensor 100 comprising end regions 104 and 106 separated by a central region 102. MR layer 110 is separated from a soft adjacent layer (SAL) 120 by a non-magnetic, electrically conducting spacer 115 and all three layers are formed in the central region 102. The SAL 120 transversely bias the MR layer 110. Hard bias layers 130 and 135 formed in the end regions 104 and 106, respectively, longitudinally bias the MR layer 110. Hard bias layers 130 and 135 form a contiguous junction with the MR layer 110, spacer 115, and the SAL 120. Leads 140 and 145 formed over hard bias layers 130 and 135, respectively, provide electrical connections for the flow of the sensing current $I_S$ from a current source to the MR sensor 100.

As mentioned earlier, an MR sensor exhibits a change in resistance when in the presence of a changing magnetic field. This resistance change is transformed into a voltage signal by passing a sense current through the MR element. However, there is a major problem associated with the prior art AMR sensor 100 shown in FIG. 1. The contiguous junction AMR sensor 100 typically loses about 20–40% of its magnetoresistive effect because only a portion of the sense current $I_S$ flows in the MR element 110 ($I_{S1}$). That portion of the sense current not flowing in the MR element 100 flows in the spacer 115 ($I_{S3}$, a very negligible current because of a high resistivity spacer) and the SAL 120 ($I_{S2}$). A portion of the sense current flows in the SAL 120 because SAL 120 is made of electrically conducting material which forms a parallel conductive path with the MR layer 110. FIG. 2 depicts schematically the flow of the sense current in the MR layer 110 and the SAL layer 120. The flow of current in the spacer 115 is generally very negligible and therefore not shown. Referring back to FIG. 2, it can readily be seen that:

$$I_1 = I_S(R_{SAL}/R_{MR} + R_{SAL})$$

$$I_1 = I_S(1/1 + R_{MR}/R_{SAL}) \qquad (EQ\ 1)$$

In a typical MR sensor 100:

$\rho_{MR} = 25\ \mu\Omega cm$,

MR thickness=150 Å, $\rho_{SAL} = 60\ \mu\Omega cm$, and

SAL thickness=100 Å, which means:

$R_{MR} = 32\Omega$ and $R_{SAL} = 120\Omega$.

Substituting the above numerical values in equation 1, it can readily be shown that about 21% of the sense current is lost through the SAL 120. Since only about 79% of the current flows in the MR layer 110, the read signal power is only about 62% of the read signal power without the current loss ($P=RI^2=R(0.79)^2=R(0.62)$). 21% reduction in the sense current means that the MR effect is reduced by about 38%. This loss of current which results in the loss of the MR effect is referred to as SAL sense current shunting effect. The prior art AMR sensors have so far not provided a practical solution to eliminate the SAL sense current shunting effect.

Therefore, there is a need for an invention which substantially eliminates the SAL sense current shunting effect in the MR sensors and therefore increases the magnetoresistive effect.

SUMMARY OF THE INVENTION

It is an object of the present invention to disclose an AMR sensor having an improved MR effect.

It is yet another object of the present invention to disclose an AMR sensor where the SAL current shunting effect is eliminated.

It is still another object of the present invention to disclose an AMR sensor where substantially all of the sensing current flows in the MR layer.

These and other objects and advantages are attained in accordance with the principles of the present invention by a magnetoresistive sensor having end regions separated from each other by a central region. Hard bias layers formed in the end regions provides longitudinal biasing for the MR layer formed in the central region. Each hard bias layer further forms a contiguous junction with the MR layer. A soft adjacent layer (SAL) formed in the central region and the end regions provides transverse biasing for the MR layer. The SAL is disposed over an antiferromagnetic layer (AFM)

and has its magnetization vector preferably fixed in the transverse (i.e., perpendicular to the air bearing surface) direction as a result of an exchange coupling with an antiferromagnetic (AFM) layer. Furthermore, the MR layer formed in the central region as well as the hard bias layers formed in the end regions are electrically insulated from the SAL by an insulator. Separating the SAL from the MR layer and the hard bias layers by an electrical insulator eliminates the SAL sense current shunting effect which improves the MR effect of the AMR sensor by about 20–40%.

BRIEF DESCRIPTION OF THE DRAWINGS

For a fuller understanding of the nature and advantages of the present invention, as well as the preferred mode of use, reference should be made to the following detailed description read in conjunction with the accompanying drawings. In the following drawings, like reference numerals designate like or similar parts throughout the drawings.

BEST MODE FOR CARRYING OUT THE INVENTION

The following description is the best mode presently contemplated for carrying out the invention. This description and the number of alternative embodiments shown are made for the purpose of illustrating the general principle of the present invention and is not meant to limit the inventive concepts claimed herein.

Figure 1:
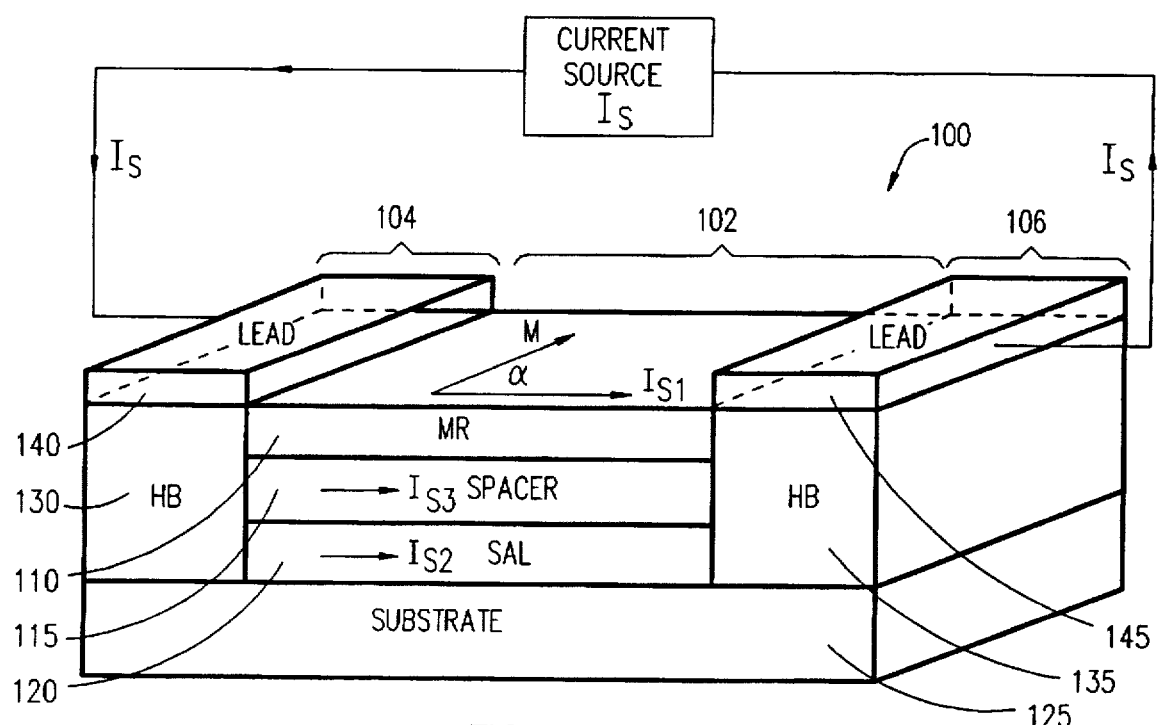
FIG. 1 is a perspective view of a prior art AMR sensor.
Figure 2:
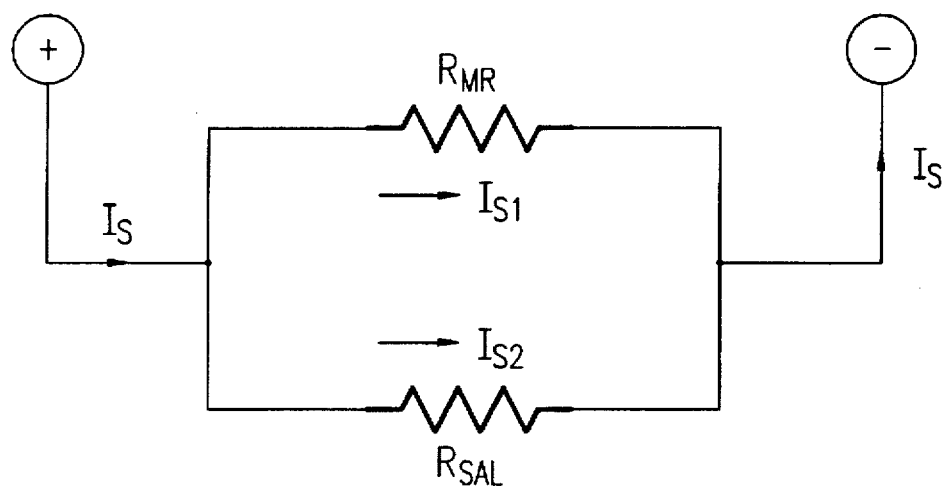
FIG. 2 is an electrical model of the MR layer and the SAL shown in FIG. 1.
Figure 3:
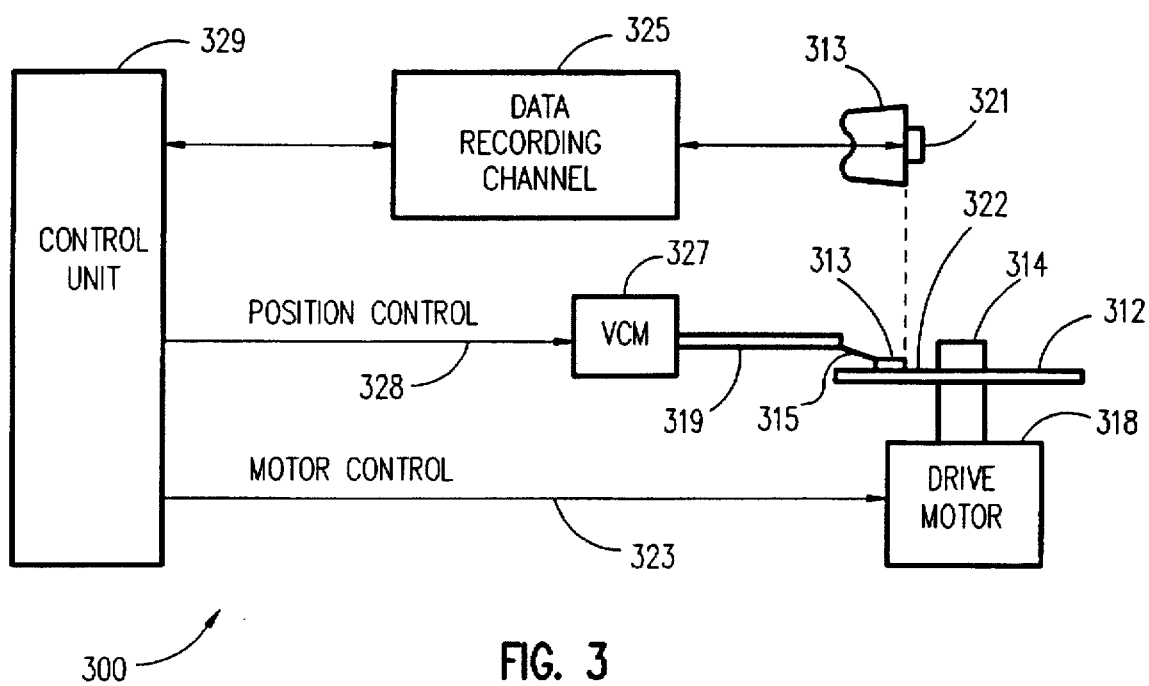
FIG. 3 is a simplified diagram of a magnetic disk storage system embodying the present invention.

Referring now to FIG. 3, there is shown a disk drive 300 embodying the present invention. As shown in FIG. 3, at least one rotatable magnetic disk 312 is supported on a spindle 314 and rotated by a disk drive motor 318. The magnetic recording media on each disk is in the form of an annular pattern of concentric data tracks (not shown) on disk 312.

At least one slider 313 is positioned on the disk 312, each slider 313 supporting one or more magnetic read/write heads 321 where the head 321 incorporates the MR sensor of the present invention. As the disks rotate, slider 313 is moved radially in and out over disk surface 322 so that heads 321 may access different portions of the disk where desired data is recorded. Each slider 313 is attached to an actuator arm 319 by means of a suspension 315. The suspension 315 provides a slight spring force which biases slider 313 against the disk surface 322. Each actuator arm 319 is attached to an actuator means 327. The actuator means as shown in FIG. 3 may be a voice coil motor (VCM). The VCM comprises a coil movable within a fixed magnetic field, the direction and speed of the coil movements being controlled by the motor current signals supplied by controller 329.

During operation of the disk storage system, the rotation of disk 312 generates an air bearing between slider 313 and disk surface 322 which exerts an upward force or lift on the slider. The air bearing thus counter-balances the slight spring force of suspension 315 and supports slider 313 off and slightly above the disk surface by a small, substantially constant spacing during normal operation.

The various components of the disk storage system are controlled in operation by control signals generated by control unit 329, such as access control signals and internal clock signals. Typically, control unit 329 comprises logic control circuits, storage means and a microprocessor. The control unit 329 generates control signals to control various system operations such as drive motor control signals on line 323 and head position and seek control signals on line 328. The control signals on line 328 provide the desired current profiles to optimally move and position slider 313 to the desired data track on disk 312. Read and write signals are communicated to and from read/write heads 321 by means of recording channel 325.

The above description of a typical magnetic disk storage system, and the accompanying illustration of FIG. 3 are for representation purposes only. It should be apparent that disk storage systems may contain a large number of disks and actuators, and each actuator may support a number of sliders.

Figure 4A:
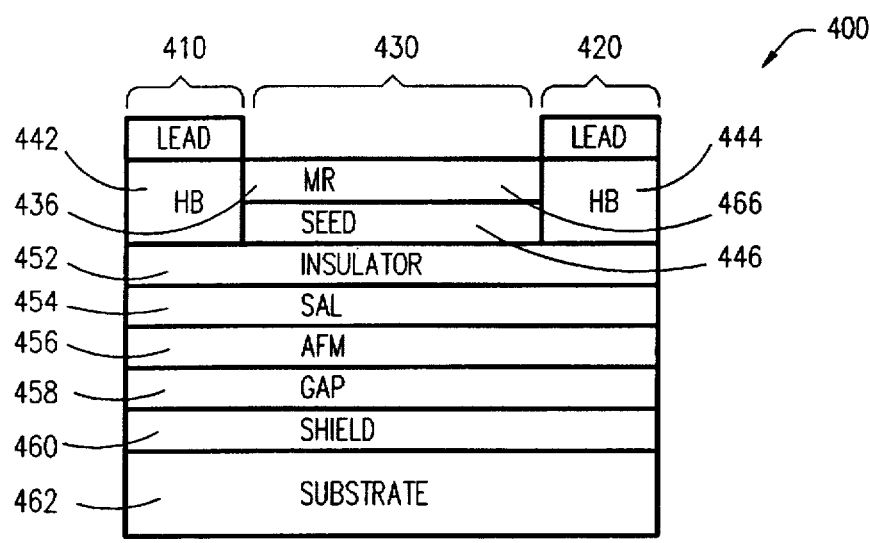
FIGS. 4A and 4B are air bearing surface and perspective views, not to scale, of the AMR sensor of the preferred embodiment of the present invention.
Figure 4B:
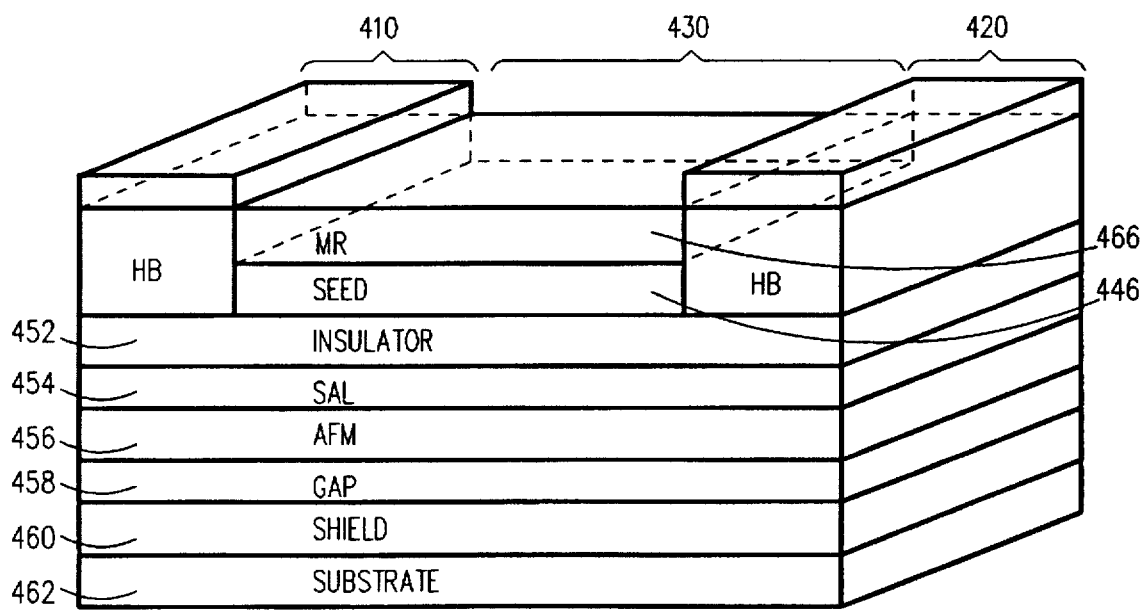

Referring now to FIGS. 4A and 4B, there are shown an air bearing surface and a perspective view, not to scale, of an AMR sensor 400 of the preferred embodiment of the present invention. AMR sensor 400 comprises passive end regions 410 and 420 separated from each other by a central active region 430. A magnetic shield layer 460 and a gap layer 458 are generally formed on a suitable substrate 462. Shield layer 460 provides magnetic insulation for the MR sensor 400 and is typically made of NiFe or sendust (TM). Gap layer 458 provides electrical insulation for the MR sensor 400 and is generally made of $Al_2O_3$ or $SiO_2$. After forming the gap layer 458, an antiferromagnetic layer (AFM) 456, a soft adjacent layer (SAL) 454 and an insulator layer 452 are also formed in that order on the gap layer 458. The AFM layer 456 which is preferably made of NiMn, although it may also be made of FeMn or NiO, is used to fix the magnetization of the SAL 454 in a fixed direction. The SAL 454 is preferably made of NiFe although it may also be made of other alloys of NiFe such as NiFeNb. In the preferred embodiment of the present invention, the SAL 454 magnetization is also fixed to be perpendicular to the air bearing surface (ABS) 466 (ABS refers to the surface of the magnetic head, including the MR sensor, adjacent the magnetic disk surface). The MR sensor 400 further comprises an MR layer 436 which is formed in the central region 430 and disposed over the insulator 452. The MR sensor 400 may further comprise a seed layer 446 made of tantalum which is disposed between the MR layer 436 and the insulator layer 452. MR layer 436 with its magnetization free to rotate under the presence of an external field is generally made of soft ferromagnetic material, such as NiFe or NiFe/Co and is preferably made of NiFe. Magnetization of the MR layer 436 is generally set to be parallel to the air bearing surface 466 in the absence of an external field.

Hard bias layers 442 and 444 which are formed in the end regions 410 and 420, respectively, longitudinally bias the MR layer 436 to ensure a single magnetic domain state for the MR layer 436. Hard bias layers 442 and 444 are preferably made of CoPtCr although they may also be made of CoPtCrTa or $CoPtCrSiO_2$. Hard bias layers 442 and 444 further form contiguous junctions with the MR layer 436.

Note that in the MR sensor 400 of the present invention, the SAL 454 is electrically insulated from the MR layer 436 and the hard bias layers 442 and 444. The electrical insulation ensures that the current (sense current) flowing in the MR layer 436 is not shunted in anyway by the SAL 454. The electrical insulation between the SAL 454 and the MR layer 436 and the hard bias layers 442 and 444 is achieved by a layer of the insulating material 452 which is disposed between the SAL 454 and the MR layer 436 and the hard bias layers 442 and 444. The insulator layer 452 is formed in the central region 430 and the end regions 410 and 420. Eliminating the SAL current shunting effect increases the MR effect of the sensor 400 by about 20 to 40%.

While the present invention has been particularly shown and described with reference to the preferred embodiment thereof, nevertheless, it will be understood by those skilled in the art that various modifications may be made therein without departing from the spirit, scope, and teaching of the present invention.

Accordingly, it is to be understood that the invention disclosed herein is not to be limited by the illustrated embodiment, but only by the scope of the appended claims.

We claim:

1. A magnetoresistive sensor (MR) having end regions separated from each other by a central region, said MR sensor comprising:

a magnetoresistive (MR) element formed in said central region;

a hard bias layer formed in each of said end regions, each of said hard bias layers forming a contiguous junction with said MR element;

an electrical insulator formed in said central region and said end regions;

a soft adjacent layer (SAL) separated from said MR element and said hard bias layers by said electrical insulator; and an antiferromagnetic (AFM) layer for pinning the magnetization of said SAL, said SAL being disposed over said AFM layer.

2. An MR sensor as recited in claim 1 wherein said SAL is selected from a group of material consisting of NiFe and NiFeNb.

3. An MR sensor as recited in claim 2 wherein said AFM layer is selected from a group of material consisting of FeMn, NiMn and NiO.

4. An MR sensor as recited in claim 1 wherein said MR element is selected from a group of material consisting of NiFe and NiFe/Co.

5. An MR sensor as recited in claim 1 further comprising a seed layer disposed between said MR layer and said insulator layer in the central region, said seed layer comprises tantalum.

6. An MR sensor as recited in claim 1 wherein said hard bias layers are selected from a group of material consisting of CoPtCr, CoPtCrTa, and CoPtCrSiO$_2$.

7. A magnetic storage system, comprising:

magnetic storage medium for recording data;

an MR sensor for reading information from said magnetic storage medium, said MR sensor having end regions separated from each other by a central region, said MR sensor comprising:

a magnetoresistive (MR) element formed in said central region;

a hard bias layer formed in each of said end regions, each of said hard bias layers forming a contiguous junction with said MR element;

an electrical insulator;

a soft adjacent layer (SAL) separated from said MR element and said hard bias layers by said electrical insulator; and an antiferromagnetic (AFM) layer for pinning the magnetization of said SAL, said SAL being disposed over said AFM layer; and a recording channel coupled to said MR sensor for detecting resistance changes in said MR sensing element responsive to applied magnetic fields representative of data recorded in said magnetic storage medium.

8. A magnetic storage system as recited in claim 7 wherein said SAL is selected from a group of material consisting of NiFe and NiFeNb.

9. A magnetic storage system as recited in claim 8 wherein said AFM layer is selected from a group of material consisting of FeMn, NiMn and NiO.

10. A magnetic storage system as recited in claim 7 wherein said MR element is selected from a group of material consisting of NiFe and NiFe/Co.

11. A magnetic storage system as recited in claim 7 further comprising a seed layer disposed between said MR layer and said insulator layer in the central region, said seed layer comprises tantalum.

12. A magnetic storage system as recited in claim 7 wherein said hard bias layers are selected from a group of material consisting of CoPtCr, CoPtCrTa, and CoPtCrSiO$_2$.

* * * * *